United States Patent
Biagini

[15] 3,653,869
[45] Apr. 4, 1972

[54] APPARATUS FOR SKIMMING THE SURFACE OF MOLTEN METAL BATHS IN THE MANUFACTURE OF GLASS

[72] Inventor: Silvano Biagini, Pisa, Italy
[73] Assignee: Compagnie de Saint-Gobain, Neuilly sur Seine, France
[22] Filed: Oct. 24, 1968
[21] Appl. No.: 770,360

[30] Foreign Application Priority Data
Oct. 24, 1967 France......................................125643

[52] U.S. Cl..............................65/182 R, 65/99 A, 65/206
[51] Int. Cl. ......................................................C03b 18/02
[58] Field of Search....................65/19, 20, 99, 182, 65, 206, 65/141, 340, 335; 210/525, 528, 537, 540; 209/229, 173, 156

[56] References Cited

UNITED STATES PATENTS

| 2,533,826 | 12/1950 | Lyle........................................65/335 |
| 3,220,813 | 11/1965 | Nogard et al. ............................65/182 |
| 3,343,936 | 9/1967 | Silverwood et al.................65/99 A X |

FOREIGN PATENTS OR APPLICATIONS 416,978    1924    Netherlands..........................209/173

*Primary Examiner*—Arthur D. Kellogg
*Attorney*—Dale A. Bauer, John L. Seymour and Bauer and Seymour

[57] ABSTRACT

Apparatus is provided for removing slag from the surface of a metal bath, for instance molten metal employed in the manufacture of glass by the flotation process, in which bays are provided in the wall of the tank along the course of the glass, the surface liquid, including floating slag, is drawn into the bays, is cleaned by skimming, and returned to the main tank. Novel mechanism if provided to control the motion of the skimmers.

3 Claims, 1 Drawing Figure

Patented April 4, 1972
3,653,869
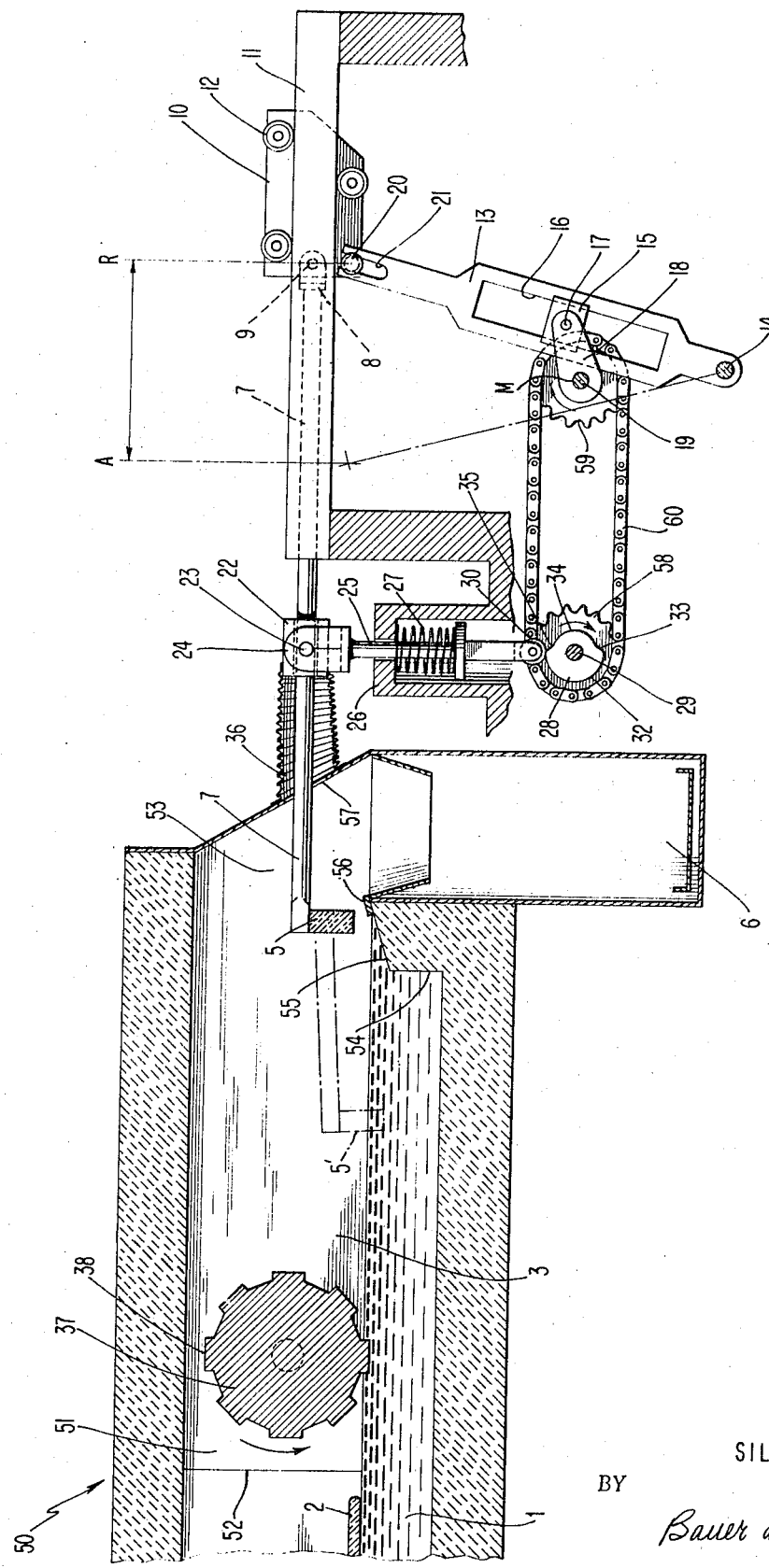
INVENTOR.
SILVANO BIAGINI
BY Bauer and Seymour
ATTORNEYS

APPARATUS FOR SKIMMING THE SURFACE OF MOLTEN METAL BATHS IN THE MANUFACTURE OF GLASS

This invention relates to apparatus and methods for skimming the surface of flotation baths in the manufacture of glass. It also relates to furnace construction in this art. In making glass by the flotation process, a continuous ribbon of glass in a fused state is drawn over a flotation bath, usually molten tin or its molten alloys, upon which it is supported and progressively cooled until it attains a viscosity such that it is proof against surface damage by contact with solid supporting means of the annealing furnace through which it passes after leaving the flotation bath. It is also known that, in spite of precautions taken to prevent the oxidation of the metallic bath, which entrains surface alterations in the glass ribbon, the reactivity of the metal usually employed is such that it is impossible to prevent the formation of more or less of the oxides and other slags. These slags, being lighter than the metal, are theoretically easy to remove by drawing them into bays situated along the sides of the flotation tank, from the surface of which they can be skimmed off by skimmers or brushes. Nevertheless, such apparatus operates with difficulty because the impact of the skimmer on the surface of the metal has a tendency to set up perturbations in the metal which prejudice the quality of the final product. The control of such apparatus is delicate and the deterioration of such apparatus is rapid.

An object of the present invention is to construct a skimming apparatus which does not set up perturbations in the bath which reach the glass and which combines with furnace construction to remove slags from the furnace without substantial loss of heat. It is also an object of the invention to design a skimming mechanism which is readily adapted in its cycle to the characteristics of different furnaces and which can be readily altered in its function for that purpose and to achieve maximum efficiency.

The above and further objects and novel features of the present invention will more fully appear from the following detailed description when the same is read in connection with the accompanying drawing. It is to be expressly understood, however, that the drawing is for the purpose of illustration only and is not intended as a definition of the limits of the invention.

The FIGURE is a vertical transverse section through a bay of the novel furnace illustrating the preferred mode of the invention.

In the drawing numeral 50 indicates generally a furnace for the manufacture of glass by the flotation process. The longitudinal wall of the furnace is indicated at 51 and the upstream wall of a skimming bay 3 by the numeral 52. These bays project outwardly from the sides of the tank, either at the ends or the sides as efficiency requires, but in the drawing the bay projects from the side and contains a portion of the flotation bath 1 upon which the glass ribbon 2 floats and over which it is drawn from the upstream to the downstream end of the furnace. Upon that bath the glass ribbon undergoes surface leveling and hardening until it can be handled without substantial damage by ordinary solid handling means. The bay 3 contains an opening 53 and a wall 54 below the opening which has an upper surface 55 in the form of a ramp partly covered by the molten metal. A graphite skimmer 5 is controlled and operated by mechanism which moves it from its skimming position 5' up over the ramp to the elevated position, above the metal bath, which it maintains on the inward stroke. The slags accumulate on the ramp as at 56 until they are finally swept into the sump 6 which is made of refractory metal or of other satisfactory construction and which has an opening 57 through which the rod 7, which carries the skimmer, passes. The opening is closed by an accordion pleated sleeve 36 of flexible refractory material which permits the longitudinal motion of the rod 7 while retaining the gas in the bay. A rotor 37 is journaled in the walls of the bay, extends substantially throughout the width of the bay, practically fills the open space above the molten liquid and is provided with lands 38, either straight or spiral, which dip into the surface of the molten metal and, when rotated gently, entrap the slags in the grooves between the lands and propel them toward the skimmer. The rotor thus serves to obstruct the escape of heat into the bay and sets up a surface flow of metal toward the ramp which carries the slags within reach of the skimmer. The return flow of molten metal is along the bottom of the bay. The top of the roller is spaced from the top of the bay by a distance which permits enough heat from the furnace to enter the bay to maintain the metal in its molten condition.

The skimmer 5 is attached to the extremity of the rod 7 which is pivotally mounted at the end outside the furnace on a carriage 10 which is supported for reciprocating motion by wheels 12 upon a rail 11. The stroke of the carriage is indicated at AR. The carriage 10 is driven with reciprocating motion by an apparatus involving a Whitworth lever 13, or its equivalent, which is pivotally mounted at 14 and reciprocated by a crank 18 driven from a shaft 19 by power means M. The crank is pivotally attached to a sliding block 15 by a pivot 17 which reciprocates in a slot 16 within the lever. The upper end of the lever is slotted at 21 and engages a pivot 20 on the carriage. The lever swings from position A to position R and back again moving the carriage with it. The carriage drives the shaft 7 which passes through a guide sleeve 22 which is pivotally mounted at 23 on the upper end of a reciprocating rod 25. The rod 25 moves vertically within a guide 26 against the opposition of a spring 27 which tends to return it to its closed position. The cover 36 encloses the pivot 23. At the lower end of the rod 25 is a roller cam follower 30 which follows a cam wheel 28 which is mounted upon a shaft 29. This cam wheel is co-ordinated in its motion with the crank 18 and the lever 13. Sprocket wheels 58, 59 are suitably mounted on the axles 19, 29 and a chain 60 connects the sprocket wheels. The cam wheel 28 has cams 33, 35 of a slope which gently raises and lowers the skimmer 5 out of and into the bath as indicated in the solid and dotted lines of 5, 5'. The rotor 38 is not necessarily synchronized with the operation of the skimmer but it may be. The cam wheel 28 determines the trajectory of the skimmer. Its profile essentially includes four surfaces which follow progressively. The first is circular which controls the advance of the skimmer into the furnace and has the maximum radius of the cam wheel, maintaining the guide 22 in elevated position during the advance. The second surface is a descent ramp 33 which lowers the skimmer into the bath. It has been established as advantageous that this ramp shall occupy about an eighth of the circumference and to be so located that the skimmer enters the bath before the lever 13 has completed its advance. The cam wheel also includes circumference 34 which controls the return movement of the rod while the skimmer is in the molten metal. Finally the cam includes the ramp 35 which has a profile corresponding to the motion of the skimmer up the ramp 55. A tight joint is provided at the place where the rod 7 enters the bay. This tight joint is made flexible, as above described, in view of the length of the stroke of the skimmer.

Other means of controlling the action, either independently or complimentary to those described can be adopted so as to change the length of the rod 25 or the course of the lever 13. For instance, the rod 25 can be connected to the cam 28 indirectly by interposing a rocker lever of which one arm constantly follows the cam while the other controls the roller 30. The vertical motion of the pivot 23 would thus be established by the profile of the cam and by the proportion of the arms of the lever, which can be varied by moving the fulcrum along the lever. In this means it is possible to mount the cam 28 directly on the shaft 19. It is also clear that other modifications can be employed without departing from the scope of the invention: for instance, the combination of two independent mechanical means for moving the skimmer horizontally and vertically which are synchronized in time but not mechanically interconnected. Such combinations accomplish the necessary regulation and provide that the different phases of the cleaning cycle proceed with requisite regularity and security. For instance the same timing mechanism could be used for the vertical stroke as for the horizontal; however, the use of a cam is particularly advantageous because it controls the motion of the skimmer with precision so that it enters the surface of the bath without shock. This also permits exact control of the skimming stroke and the end of it, so as to obtain a progress of elevation conforming to the slope of the discharge sill. The present skimmer then can be combined satisfactorily with an apparatus such as is described in U.S. Pat. No. 3,220,813, which includes a number of rollers with axes substantially horizontal, similar to 37 above described, which may be placed in the sides of the bath, to its full length, or only at the bays. These rollers turn in the direction indicated by the arrow in our present figure so as to propel the surface liquid and slag into the bay. Such rollers can be smooth or as indicated in this description.

As many apparently widely different embodiments of the present invention may be made without departing from the spirit and scope thereof, it is to be understood that the invention is not limited to the specific embodiments.

What is claimed is:

1. Apparatus comprising a molten metal flotation bath adapted to the support of flat glass, and means to skim dross from the bath comprising skimmer means, coordinated means to impart reciprocating motion of the skimmer means toward and away from the locus of the flat glass on the bath, vertically movable means to raise the skimmer means from the bath at the beginning of its motion toward the locus of the glass, and means to gradually lower the skimmer means into contact with the bath as it nears the end of its motion toward the glass, whereby the skimmer means is under positive control as it engages the bath, including horizontally reciprocating means pivotally attached to the skimmer means, and synchronizing means coordinating the horizontally and vertically movable means, means to receive dross skimmed from the bath by the skimmer means.

2. Apparatus according to claim 1 including means to mount the skimmer means for vertical motion, positive control means controlling the vertical position of the skimmer means as it approaches the locus of the glass, including means to ease the skimmer into the bath at the inner end of its stroke, and means to coordinate the reciprocating means and the vertical-position controlling means.

3. Apparatus according to claim 2 in which the synchronizing means includes a cam and cam follower operatively attached to the skimmer means to impart vertical motion thereto and reciprocating lever means between the synchronizing means and the horizontally reciprocable carriage means.

* * * * *